United States Patent Office.

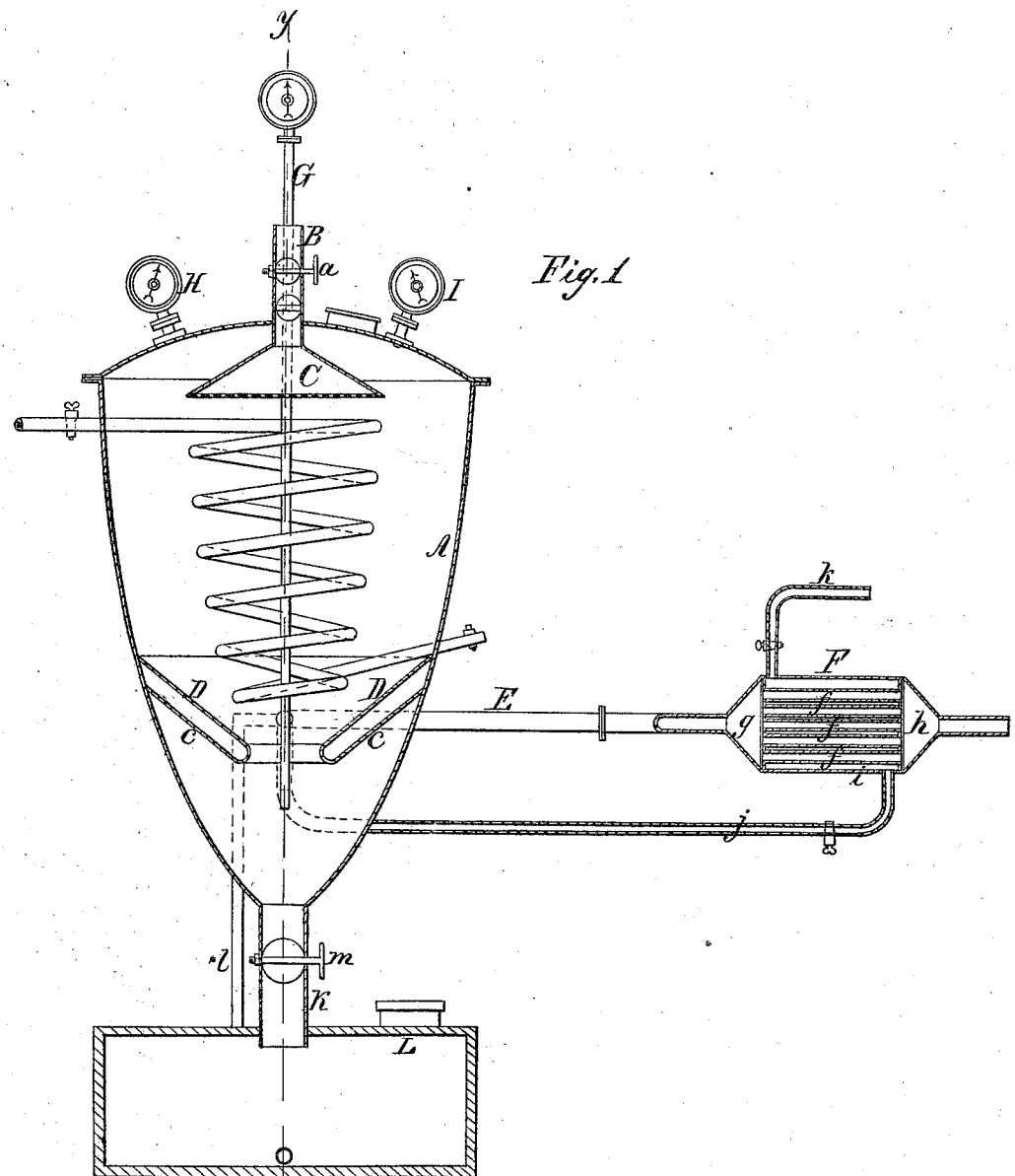

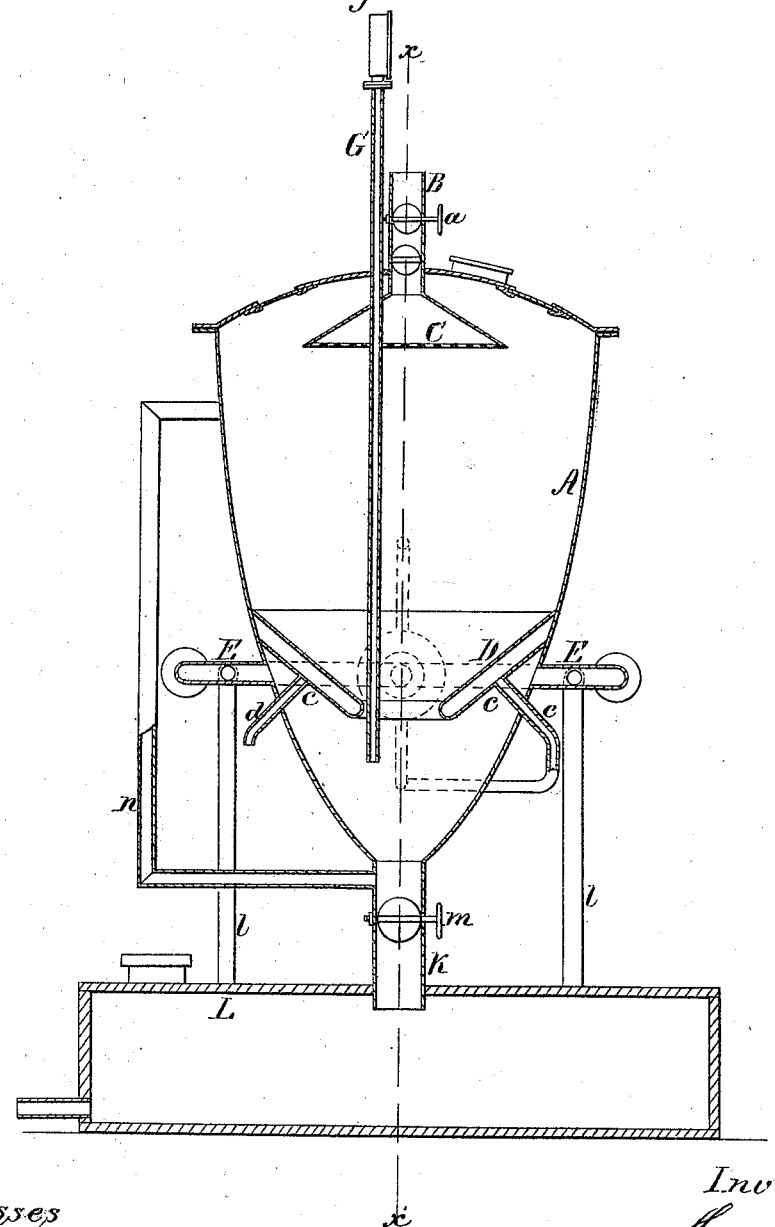

HENRY GROGAN, OF FLATBUSH, NEW YORK.

Letters Patent No. 94,884, dated September 14, 1869.

IMPROVED VACUUM-STILL.

The Schedule referred to in these Letters Patent and making part of the same.

*To all whom it may concern:*

Be it known that I, HENRY GROGAN, of Flatbush, in the county of Kings, State of New York, have invented a new and improved Vacuum-Still; and I do hereby declare the following to be a full, clear, and exact description thereof, which will enable those skilled in the art to make and use the same, reference being had to the accompanying drawing, forming part of this specification, in which—

Figure 1 represents a vertical central section of this invention, the line $x\ x$, fig. 2, indicating the plane of section.

Figure 2 is a similar section of the same, taken in the plane indicated by the line $y\ y$ in fig. 1.

Similar letters indicate corresponding parts.

This invention consists in the arrangement of a conical steam-jacket in the interior of the still, and over the mouth of the vapor-discharge pipe or pipes, in such a manner that the vapors have to travel upward under the jacket before they are able to enter the discharge-pipe or pipes, and thereby the discharge of liquid not perfectly vaporized is avoided; further, in the arrangement of a hot-water condenser, in combination with the vapor-discharge pipes, the still, and residuum-reservoir, in such a manner that by said condenser a more or less perfect vacuum is created, whereby the discharge of the vapors from the still and from the residuum-reservoir is materially facilitated.

In the drawing—

The letter A represents a still, which may be egg-shaped, or in any other suitable form or shape, and which is intended to be heated by a steam-coil, indicated in red outlines in the drawing.

Through the top of this still passes the supply-pipe B, which terminates at a short distance below the top in a rose or sprinkler, C, so that the liquid admitted through said pipe is caused to pass into the still in the form of a spray.

A suitable valve or stop-cock, $a$, connected to the pipe B, serves to regulate the supply of liquid to the still.

On reaching the still the liquid is heated by the action of the steam-coil, and it is vaporized before it reaches the bottom part of the still.

The vaporization is still further facilitated by a conical steam-jacket, D, which is secured in the lower part of the still, as shown in the drawing, so that a hollow conical space, $c$, is formed between its outer surface and the inner surface of the still.

This jacket is heated by steam admitted through a pipe, $d$, and allowed to exhaust through a pipe, $e$.

The vapors formed in the still pass off through the discharge-pipe or pipes E, which emanate from points of the still below its top, unlike the ordinary goose-necks, which invariably emanate from the highest part of the still.

In practice I introduce the discharge-pipes at points under the jacket D, so that the vapors formed in the still have to pass up into the conical space $c$ before they are enabled to reach the mouths of the discharge-pipes.

The discharge of the vapors from the still is facilitated by the action of a condenser, F, which is composed of a series of pipes, $f$, enclosed in a drum, $i$, and connecting with a receiving-chamber, $g$, and with a discharge-chamber, $h$, the receiving-chamber being connected to the discharge-pipes E of the still, while the discharge-chamber $h$ connects, by a suitable pipe, with a second condenser or with a worm.

The drum $i$ is filled with water, which is kept at the required temperature by steam admitted through the pipe $j$, and discharging through the pipe $k$, said temperature being so regulated that the least volatile parts of the vapors are condensed in the first condenser, and the less volatile parts in subsequent condensers, so that the various grades of the liquid can be separated without difficulty, and before the vapors pass out of my apparatus.

By the action of the condenser F, a partial vacuum is created, which materially facilitates the discharge of the vapors from the still.

The temperature of the still is observed by a pyrometer, G, introduced through the top, and a pressure-gauge, H, and vacuum-gauge I, also applied to the top of the still, serve to observe the pressure or the state of the vacuum in the still, and enable the operator to regulate his operations accordingly.

In using my still for distilling petroleum or other liquids of a similar nature, I connect it, by means of a foot-pipe, K, with a residuum-tank, L.

From this residuum-tank extend two pipes, $l\ l$, which communicate with the discharge-pipes E of the still, or with the condenser F, so that a partial vacuum is formed in said tank; and thereby the vapors carried down into the tank, together with the residuum, are disengaged and caused to pass off with the vapors discharging from the still.

To the foot-pipe K is applied a stop-valve, $m$, which is closed until a certain quantity of tar or non-vaporized liquid has accumulated in the bottom part of the still.

The quantity of tar thus accumulated is observed by means of a transparent pipe or fluid-gauge, $n$, which connects with the still at top and bottom, and if the tar or non-vaporized liquid has accumulated to a certain depth, the stop-valve $m$ is opened, and said tar is deposited in the residuum-tank L, whence it is discharged, from time to time, or as may be desired.

When my still is used for distilling whiskey, or other similar liquids, the residuum-tank is not required, and the stop-valve $m$ can remain closed during the whole operation.

What I claim as new, and desire to secure by Letters Patent, is—

1. The conical steam-jacket D, in the interior of the still, and over the mouth of the discharge-pipe, substantially as set forth.

2. The arrangement and combination of the still A, jacket D, discharge-pipe E, and condenser G, substantially as set forth.

3. The arrangement and combination of the still A, jacket D, discharge-pipe E, residuum-tank L, pipes $l\ l$, and condenser G, all as substantially shown and described.

This specification signed by me, this 6th day of April, 1869.

HENRY GROGAN.

Witnesses:
W. HAUFF,
C. WAHLERS.